United States Patent
Sun et al.

(10) Patent No.: US 6,849,978 B2
(45) Date of Patent: Feb. 1, 2005

(54) MOTOR HAVING A MAGNETIC BEARING

(75) Inventors: Sung-wei Sun, Taoyan (TW); Ming-shi Tsai, Taoyan (TW); Wen-shi Huang, Chung Li (TW); Kuo-cheng Lin, Taoyan (TW)

(73) Assignee: Delta Electronics, Inc., Taoyuan Hsien (TW)

(*) Notice: Subject to any disclaimer, the term of this patent is extended or adjusted under 35 U.S.C. 154(b) by 137 days.

(21) Appl. No.: 10/066,374

(22) Filed: Feb. 5, 2002

(65) Prior Publication Data

US 2003/0146668 A1 Aug. 7, 2003

(51) Int. Cl.$^7$ ............................................. H02K 7/09
(52) U.S. Cl. .................... 310/90.5; 310/90; 384/100
(58) Field of Search .................. 310/90.5, 90, 67 R; 384/107, 100, 112; 360/99.08

(56) References Cited

U.S. PATENT DOCUMENTS

| | | | | |
|---|---|---|---|---|
| 5,019,738 A | * | 5/1991 | Weilbach et al. | 310/90.5 |
| 5,835,124 A | * | 11/1998 | Fukita et al. | 347/260 |
| 6,340,854 B1 | * | 1/2002 | Jeong | 310/90 |
| 6,420,810 B1 | * | 7/2002 | Jeong | 310/90.5 |
| 6,435,722 B1 | * | 8/2002 | Horng | 384/279 |
| 6,567,268 B1 | * | 5/2003 | Hsieh | 361/695 |
| 6,617,736 B1 | * | 9/2003 | Horng et al. | 310/91 |
| 6,654,213 B2 | * | 11/2003 | Horng et al. | 361/23 |

* cited by examiner

*Primary Examiner*—Dang Le
*Assistant Examiner*—Leda Pham
(74) *Attorney, Agent, or Firm*—Birch, Stewart, Kolasch & Birch, LLP

(57) ABSTRACT

A motor having a magnetic bearing. The motor includes a base provided with a bearing seats, a stator fixed to the base, a rotor equipped with a rotation shaft and able to rotate relative to the stator by magnetic forces generated from excitation, a bearing fastened to the bearing seat of the base for accommodating the rotation shaft of the rotor, and a magnetic unit composed of a first, a second and a third magnetic elements. The second magnetic element is located below the first magnetic element. The third magnetic element is located below the second magnetic element. By employing the magnetic force, the second magnetic element is restrained between the first and third magnetic elements, thereby limiting a shift range of the rotation shaft.

19 Claims, 8 Drawing Sheets

MOTOR HAVING A MAGNETIC BEARING

BACKGROUND OF THE INVENTION

1. Field of the Invention

The invention relates to a motor structure and, more particularly, to a motor having a magnetic bearing using magnetic forces to avoid rotation friction.

2. Description of the Related Art

Referring to the prior fan motor structure shown in FIGS. 1 and 2, the structure includes a base 12, a stator 13, a rotor 14 and a bearing 15.

Referring to FIG. 1, the base 12 is located in the center of a fan frame 201 and the base 12 and the fan frame 201 are integrally formed together. A bearing seat 21 is located in the center of the base 12. An accommodation portion 31 is provided in the center of the stator 13. Outside the accommodation portion 31 are a coil 32 and a piece of silicon steel 33, with a circuit board 34 underneath. The coil 32, the silicon steel 33 and the circuit board 34 are electrically connected. The accommodation portion 31 is telescoped to the outer surface of the bearing seat 21 of the base 12.

Referring to FIG. 2, the rotor 14 includes a hollow cylinder 44 that has an open end. A set of fan blades 43 are attached to the outer wall of the hollow cylinder 44 while a ring-shaped magnet 41 is allocated at its inner wall. A rotation shaft 42 is provided at the center of the ring-shaped magnet 41 and is accommodated in the bearing 15. When the coil 32 of the stator 13 is electrically excited, the rotor 14 is able to rotate relatively to the stator 13 due to the magnetic forces.

The bearing 15 is a self-lubricating bearing fixed onto the bearing seat 21 of the base 12. It accommodates the rotation shaft 42 of the rotor 14.

The elastic washer 7 is telescoped on the upper part of the rotation shaft 42 to act as an elastic buffer between the rotor 14 and the bearing 15.

The C-ring 16 is jointed with a groove 133 situated near the lower end of the rotation shaft 42 to prevent the rotor 14 from disengaging from the base 12.

It is observed from the above structure that, in prior structures, the C-ring 16 is employed to axially position the rotation shaft 42 of the rotor 14. To describe at length, when the rotor 14 rotates due to the electric excitation of the coil 32, the wind force F1 acts downwards towards the bottom of the base 12, and as a result of the counterforce F2, the rotor 14 disengages from the base 12. Therefore, the presence of the C-ring 16 prohibits the rotor 14 from disengaging from the base 12.

However, in the first prior technique, when the fan rotates, wear and heat due to friction occur between the C-ring 16 and the rotation shaft 42, thereby shortening the operational life span. Also, the friction between the C-ring 16 and the rotation shaft 42 generates noise, or unsteady rotation speed may occur depending on the degree of friction. Over the above description, the rotor 14 and the stator 30 are designed with magnetic bias therebetween. Therefore, when the rotor 14 rotates, magnetic levitation is created, resulting in magnetic equilibrium between the rotor 14 and the stator 30 at a stable position. However, during the rotation, the rotor 14 deviates the rotation shaft 42 consequent on the external forces, such as wind forces, it receives, in such a manner that the rotor 14 and the stator 30 are no longer in previous equilibrium positions, but are in new equilibrium positions depending on the degree of the received external forces. This gives rise to a comparatively great difficulty in the design.

SUMMARY OF THE INVENTION

One object of the invention is to provide a motor having a magnetic bearing that employs magnetic forces to adjust the position of rotation shaft and then form a non-contact axial positioning, hence avoiding contact wear during operation.

Another object of the invention is to provide a motor having a magnetic bearing that utilizes magnetic forces to compensate the original magnetic bias insufficiency, and hence the rotor is able to stay in a stationary equilibrium position during operation.

Another object of the invention is to provide a motor having a magnetic bearing, in which the rotor is designed to rotate in reverse without deviating the original magnetic equilibrium.

The other object of the invention is to provide a motor having a magnetic bearing, which uses the repulsion principle between the magnetic elements so as to allow the rotor to axially shift within the allowable range formed between the rotor and the magnetic elements, so that when the motor incurs vibration or collision, the magnetic elements do not shatter.

To accomplish the above objects, the motor having a magnetic bearing of the invention includes: a base provided with a bearing seat; a stator fixed onto the base; a rotor equipped with a rotation shaft and able to rotate relative to the stator by magnetic forces generated from excitation; a bearing fastened onto the bearing seat of the base for accommodating the rotation shaft of the rotor; and a magnetic unit composed of a first, a second and a third magnetic elements, wherein the first magnetic element is anchored to the bearing seat, the second magnetic element is fastened onto the outside of the bearing seat and is located below the first magnetic element, and the third magnetic element is fixed onto the base and is located below the second magnetic element. In addition, the first and second magnetic elements are of the same pole and repulsive to each other; likewise, the second and the third magnetic elements are of the same pole and repulsive to each other. With the aid of the magnetic unit, the second magnetic element is refrained between the first and third magnetic elements, and therefore the axial shift range of the rotation shaft is limited.

By the above structure, the movement force towards one direction produced by the rotation of the rotor, is counterbalanced by the magnetic forces in the opposite direction brought out by the magnetic unit, thus avoiding contact wear of rotation and at the same time recovering the magnetic bias insufficiency, so that the rotor is able to stay at a stationary equilibrium position during rotation.

BRIEF DESCRIPTION OF THE DRAWINGS

The above and other objects, advantages and features of the invention will become apparent from the following description with reference to the accompanying drawings that illustrate examples of the invention, in which.

DETAILED DESCRIPTION OF THE PREFERRED EMBODIMENTS

Figure 1:
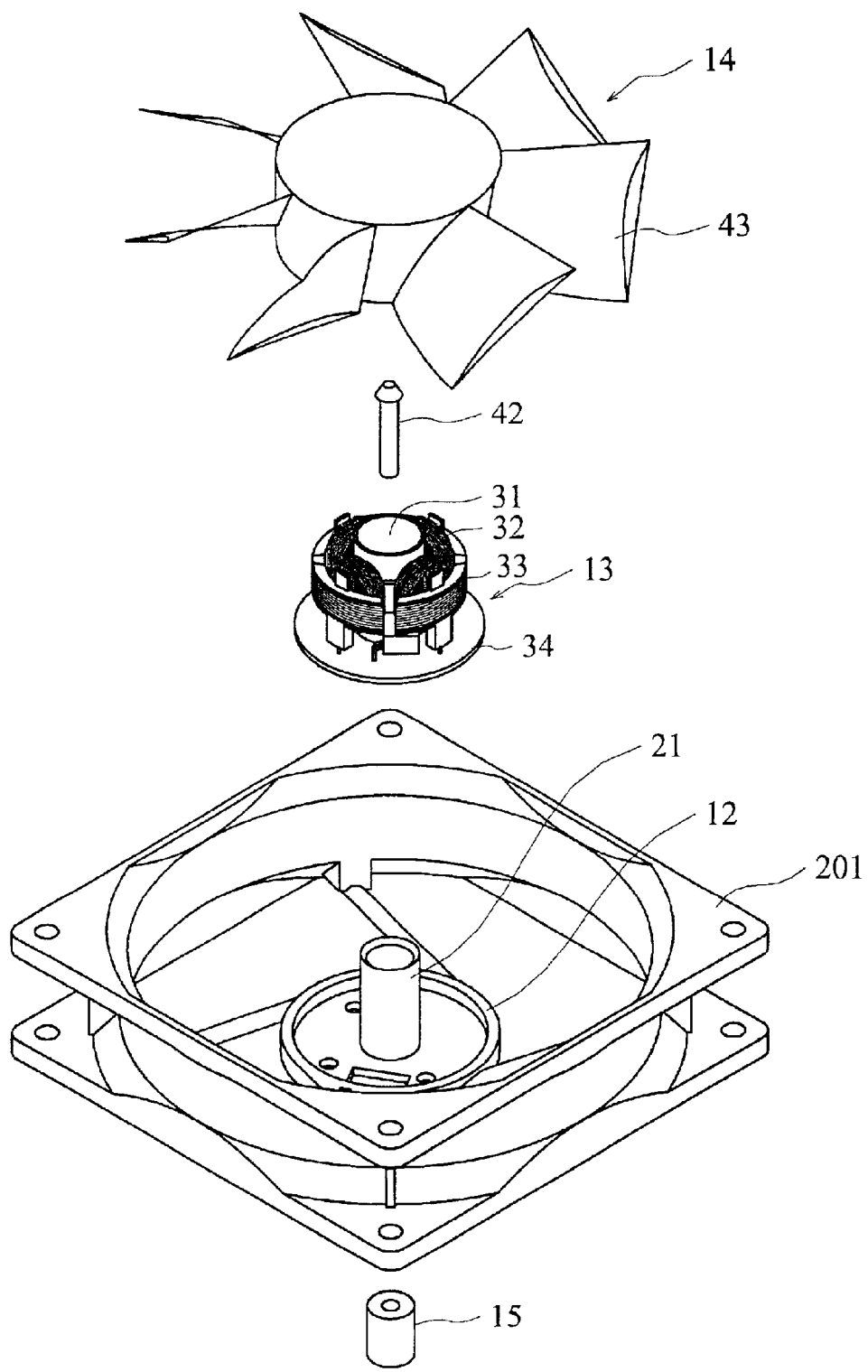
FIG. 1 is a three-dimensional exploded view of a conventional fan motor.
Figure 2:
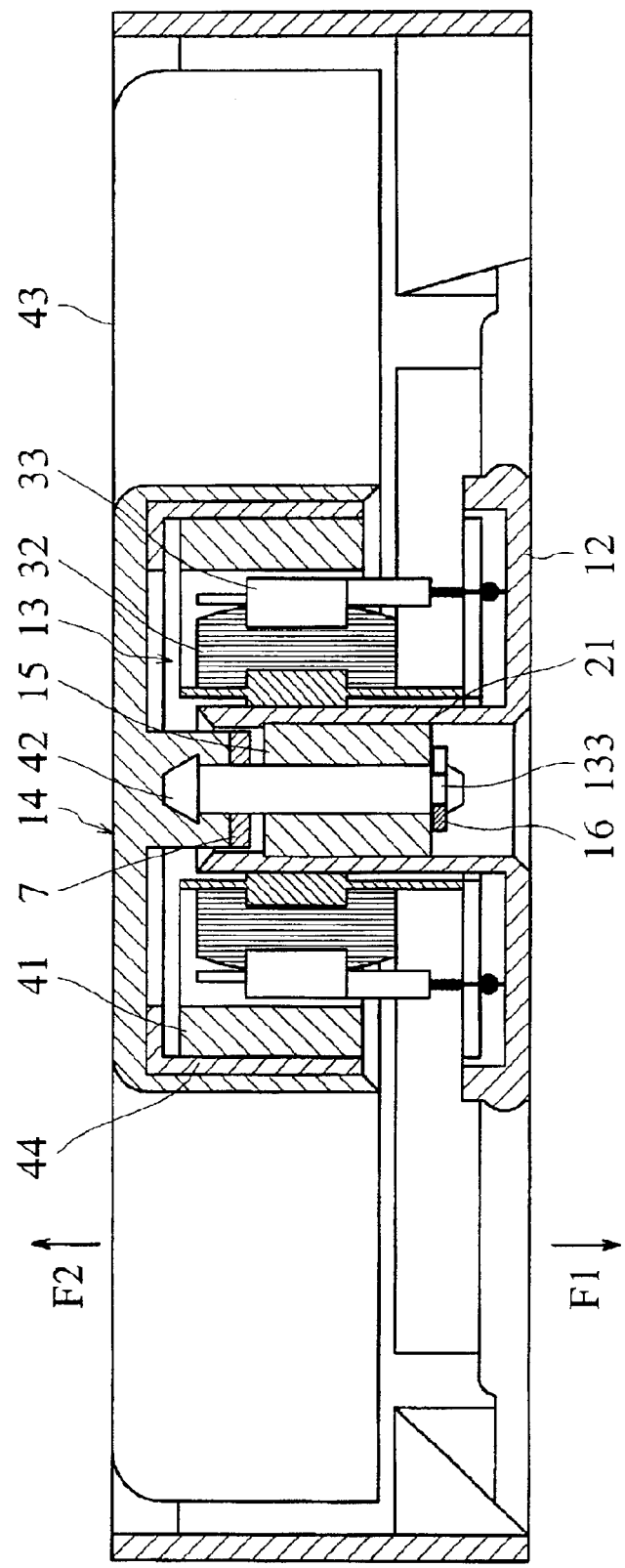
FIG. 2 is a sectional view of a fan motor structure in accordance with the prior art.
Figure 3:
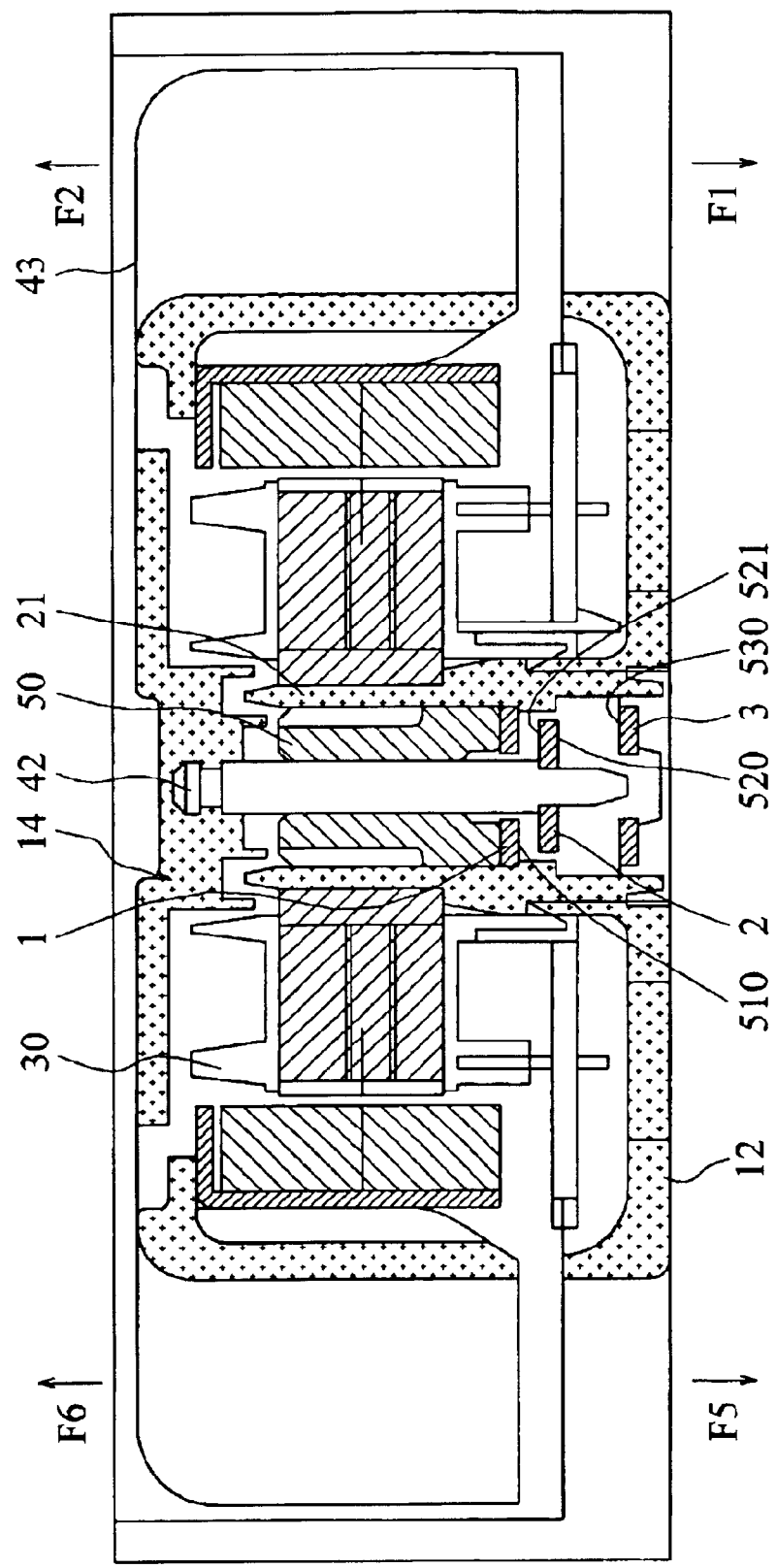
FIG. 3 is a sectional view of the motor having a magnetic bearing in accordance with a first embodiment of the invention.

Referring the first embodiment of the invention shown in FIG. 3, the embodiment is a fan motor structure including a base 12, a stator 30, a rotor 14, a bearing 50 and a magnetic unit. The bearing 50 is fastened to the bearing seat of the base for accommodating and supporting the rotation shaft of the rotor.

The magnetic unit is composed of a first magnetic element 1, a second magnetic element 2 and a third magnetic element 3. The first and second magnetic elements 1 and 2 are of the same pole and repulsive to each other. The second magnetic element 2 is ring-shaped with its center hole telescoped near the lower end of the rotation shaft 42. The first magnetic element 1 is secured to the bottom part of the bearing 50 and is located above the second magnetic element 2, and it has a hole with a diameter comparatively larger than that of the rotation shaft 42 such that when the rotation shaft 42 passes through the center hole of the first magnetic element 1, both of them do not come into contact with each other. The third magnetic element 3 is fixed onto the base 12 and is located below the second magnetic element 2. The second and third magnetic elements 2 and 3 are of the same pole and repulsive to each other.

By the structure described above, during the rotation of the rotor 14, a wind force F1, which is produced by the fan blades 43 shown in FIG. 3, acts downwards towards the bottom of the base 12, and a counterforce F2 disengages the rotation shaft 42 from the base 12. However, as a lower surface 510 of the first magnetic element 1 and a upper surface 521 of the second magnetic element 2 are magnetically repulsive to each other, the first magnetic element 1 is anchored onto the bearing seat 21 and is situated above the second magnetic element 2, and therefore a force shifting the rotation shaft downwards (that is, towards the base 12) is generated, thereby counterbalancing the counterforce F2. Consequently, the rotor 14 does not disengage from the base 12 in the presence of the counterforce F2.

When the rotor 14 is designed to rotate in reverse, a wind force F6 is produced acting upwards towards the top of the base 12, and a counterforce F5 acting towards the base is also created at the same time. To avoid friction between the rotor 14 and the bearing 50, the lower surface 520 of the second magnetic element 2 and the upper surface 530 of the third magnetic element 3 of the magnetic unit in the embodiment are magnetically repulsive. The second magnetic element 2 is telescoped near the lower end of the rotation shaft 42, and the third magnetic element 3 is fixed onto the base 12. In such a manner, the repulsion of the second and third elements 2 and 3 respectively, is employed to counterbalance the counterforce P5, and the friction between the rotor 14 and the bearing 50 is thus avoided. In addition, according to the structure described above, the bearing 50 also has the function of supporting the rotation shaft 42 to assist in maintaining the rotor 14 and the stator 30 at their equilibrium positions. Thus, the motion of the rotor 14 can be limited along the axial direction and stabilized. According to FIG. 3, the self-lubricating bearing 16 is fastened to the bearing seat of the base for accommodating and supporting the rotation shaft of the rotor to limit the rotation shaft along the axial direction. Furthermore, the rotor 14 will be balanced in accordance with the wind force and the magnetically repulsive force, which is provided by the magnetic elements, along the axial direction.

For the reason that the closer the first and second magnetic elements 1 and 2 approach each other, the greater the repulsive force gets (the repulsive force is directly proportional to $1/(distance^2)$), the contact and friction do not occur between the first and second magnetic elements 1 and 2, thus achieving a non-contact positioning effect during rotation. In the meanwhile, the repulsive force resisting the external force (counterforce F2) compensates the magnetic bias insufficiency between the rotor 14 and the stator 30 so that the original magnetic equilibrium during rotation is not deviated because of external forces. Similarly, the closer the second and third magnetic elements 2 and 3 approach each other, the greater the repulsive force gets (the repulsive force is directly proportional to $1/(distance^2)$), so that contact and friction do not occur between the second and third magnetic elements 2 and 3, thus achieving a non-contact positioning effect during rotation. In the meanwhile, the repulsive force resists the external force (counterforce F5), so the second magnetic element 2 is able to locate itself in the center of the first and third magnetic elements 1 and 3 to obtain equilibrium and is not deviated towards either of them, hence attaining the axial positioning of the rotation shaft 42.

Figure 4:
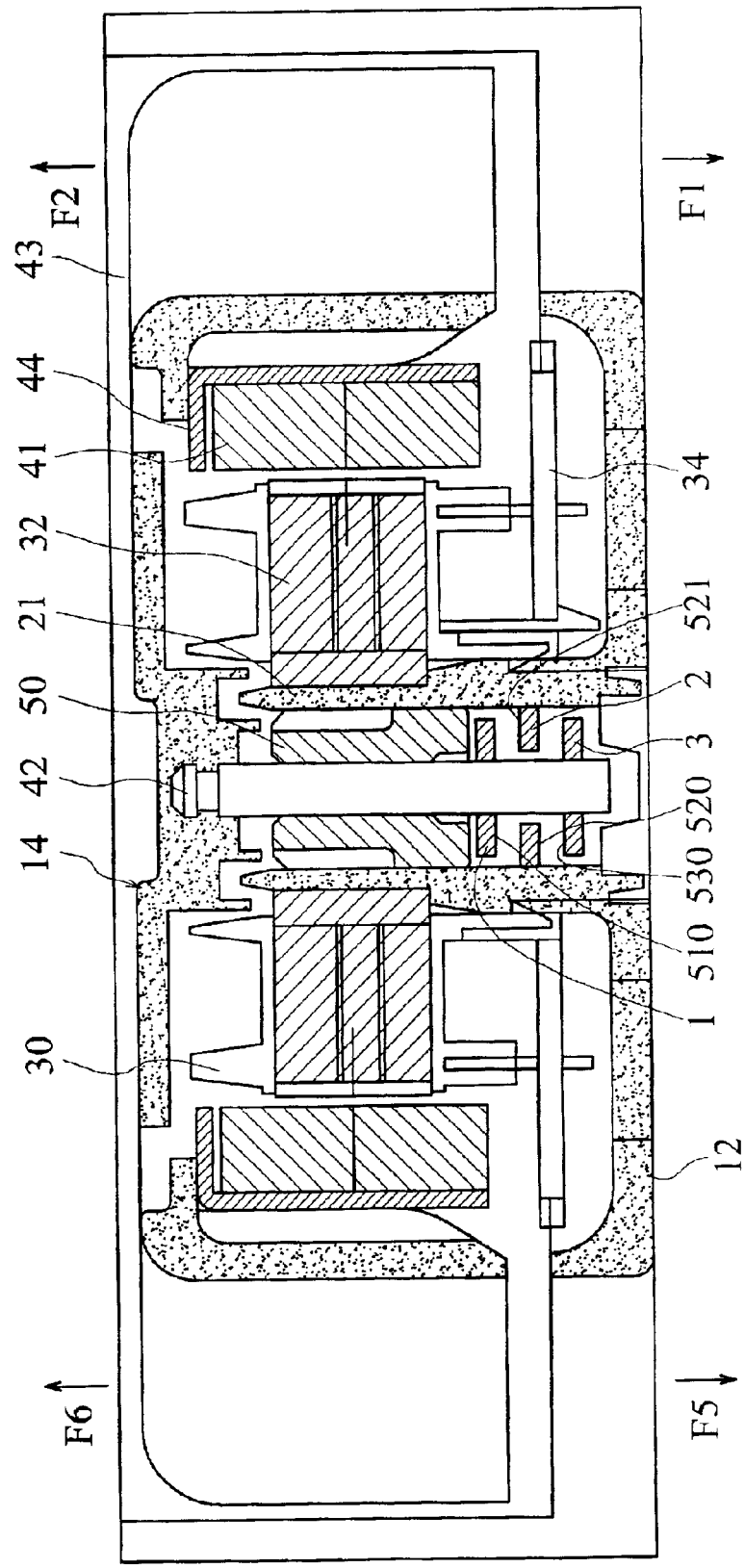
FIG. 4 is a sectional view of the motor having a magnetic bearing in accordance with a second embodiment of the invention.

Referring now to the second preferred embodiment of the invention shown in FIG. 4, the fan motor structure in the embodiment includes a base 12, a stator 30, a rotor 14, a bearing 50 and a magnetic unit.

The magnetic unit is composed of a first magnetic element 1, a second magnetic element 2 and a third magnetic element 3. The first and second magnetic elements 1 and 2 are of the same pole and repulsive to each other. The first magnetic element 1 is ring-shaped with its center hole telescopically fitted to the rotation shaft 42. The second magnetic element 2 is secured to the bearing seat 21 and is located below the first magnetic element 1. The second magnetic element 2 has a hole with a diameter larger than that of the rotation shaft 42 such that when the rotation shaft 42 passes through the center hole of the second magnetic element 2, both of them do not come into contact with each other. The third magnetic element 3 is ring-shaped with its center hole telescopically fitted to the lower end of the rotation shaft 42 and is located below the second magnetic element 2. The second and third magnetic elements 2 and 3 are of the same pole and repulsive to each other.

Because the magnetic unit of the second preferred embodiment operates in the same fashion as that of the first preferred embodiment, the detailed description is omitted.

Alternatively, the first and third magnetic elements 1 and 3 can be of same pole different from that of the second magnetic element 2. The attractive magnetic forces between the first and second magnetic elements 1 and 2 and the second and third magnetic elements 2 and 3 can also achieve magnetic equilibrium so as to obtain the axial positioning.

Figure 5:
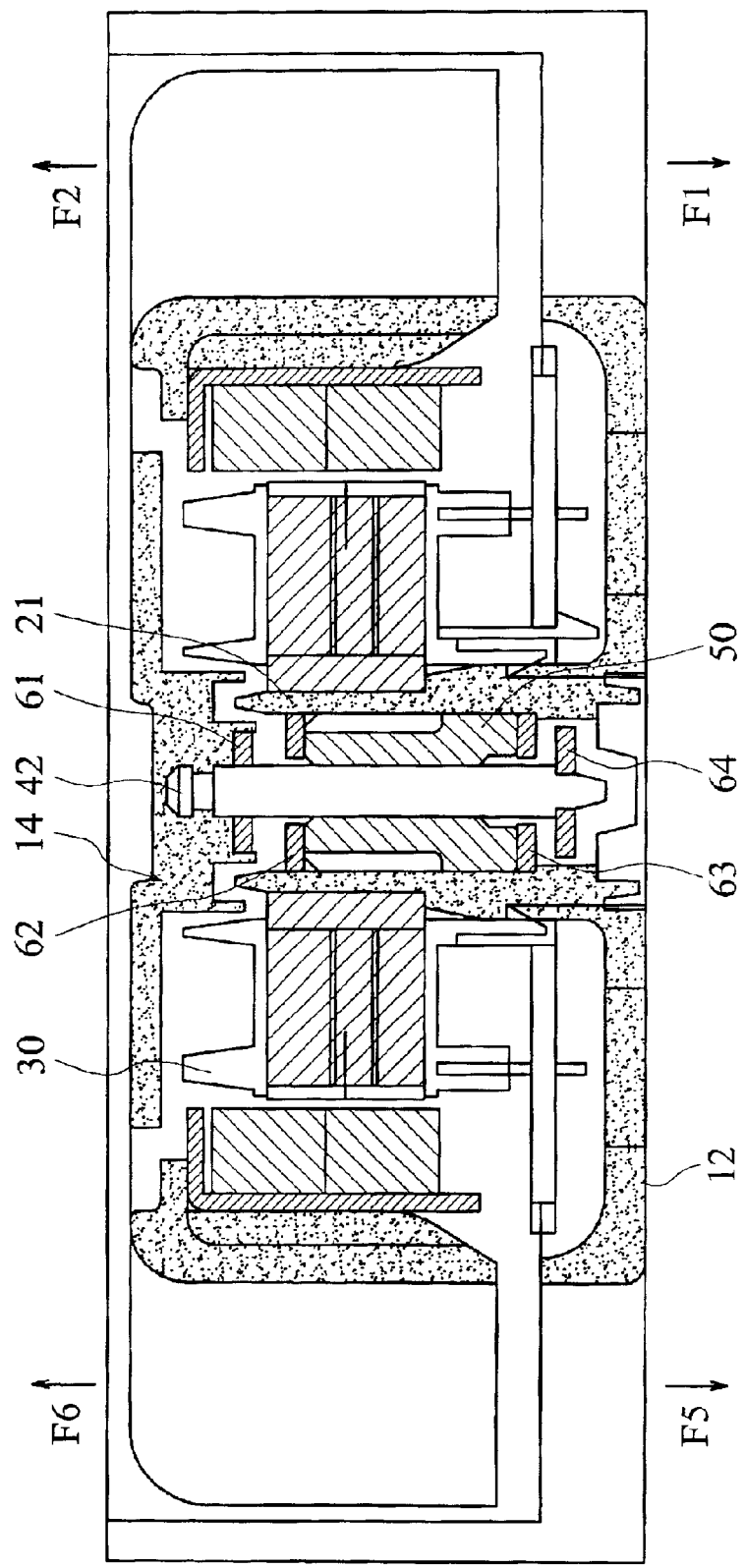
FIG. 5 is a sectional view of the motor having a magnetic bearing in accordance with a third embodiment of the invention.

Referring to the third preferred embodiment of the invention shown in FIG. 5, the fan motor structure in the embodiment includes a base 12, a stator 30, a rotor 14, a bearing 50 and upper and lower magnetic units.

The upper magnetic unit is composed of a first magnetic element 61 and a second magnetic element 62. The first and second magnetic elements 61 and 62 are of the same pole and repulsive to each other. The second magnetic element 62 is secured to the upper end of the bearing 50 and has a center hole with a diameter larger than that of the rotation shaft 42, to such an extent that when the rotation shaft 42 passes through the center hole of the second magnetic element 62, both of them do not come into contact with each other. The first magnetic element 61 is ring-shaped with its center hole telescopically fitted to the rotor 14 and is located above the second magnetic element 62.

The lower magnetic unit is composed of a third magnetic element 63 and a fourth magnetic element 64. The third and fourth magnetic elements 63 and 64 are of the same pole and repulsive to each other. The third magnetic element 63 is ring-shaped with its center hole telescopically fitted to the lower end of the rotation shaft 42. The third magnetic element 63 is secured to the lower end of the bearing 50 and is located above the fourth magnetic element 64, and it has a center hole with a diameter larger than that of the rotation shaft 42, to such an extent that when the rotation shaft passes through the third element 63, both of them do not come into contact with each other.

By the above-mentioned structure of the third preferred embodiment of the invention, a magnetically repulsive force F2 (F6) is produced between the first and the second magnetic elements 61 and 62; and a magnetically repulsive force F1 (F5) is produced between the third and fourth magnetic elements 63 and 64 at the same time. Therefore, the magnetically repulsive force F2 (F6) that pushes the rotation shaft 42 towards the base 2 and the force F1 (F5) that pushes the rotation shaft 42 out of the base 2 cooperatively provide an axial positioning effect to the rotation shaft 42.

Figure 6:
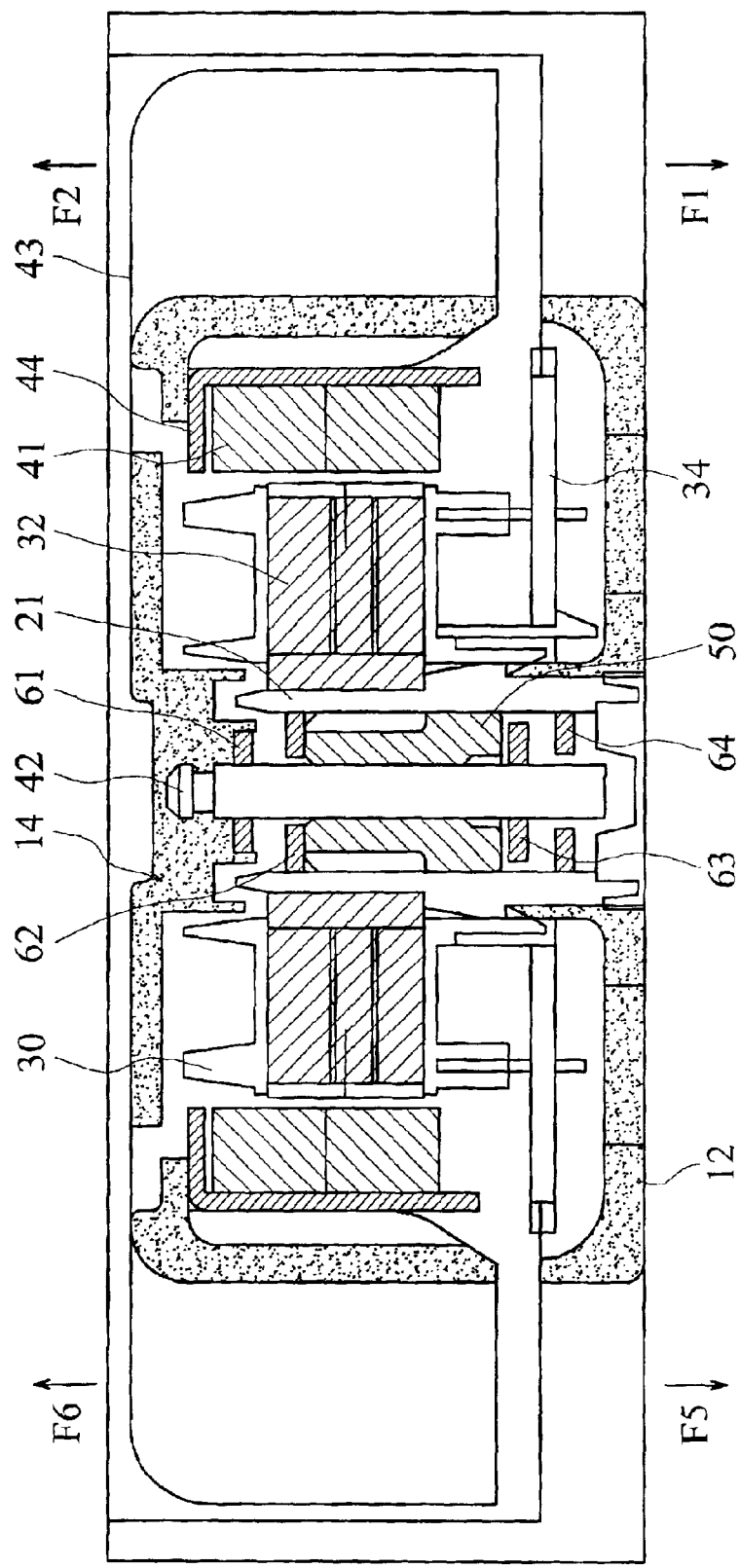
FIG. 6 is a sectional view of the motor having a magnetic bearing in accordance with a fourth embodiment of the invention.

Referring now to the fourth preferred embodiment of the invention shown in FIG. 6, the motor fan structure includes a base 12, a stator 30, a rotor 14, a bearing 50 and upper and lower magnetic units.

The upper magnetic unit is composed of a first magnetic element 61 and a second magnetic element 62. The first and second magnetic elements 61 and 62 are of the same pole and repulsive to each other. The second magnetic element 62 is fastened to the upper end of the bearing 50 and has a center hole with a diameter larger than that of the rotation shaft 42, to such an extent that when the rotation shaft 42 passes through the center hole of the second magnetic element 62, the two do not come into contact with one another. The first magnetic element 61 is ring-shaped with its center hole telescopically fitted to the rotor 14 and above the second magnetic element 62.

The lower magnetic unit is composed of a third magnetic element 63 and a fourth magnetic element 64. The third and fourth magnetic elements 63 and 64 are of the same pole and repulsive to each other. The third magnetic element 63 is ring-shaped with its center hole telescopically fitted to the rotation shaft 42. The fourth magnetic element 64 is secured to the bearing seat 21 and is located below the third magnetic element 63, and it has a center hole with a diameter larger than that of the rotation shaft 42, to such an extent that when the rotation shaft passes through the third element 63, the two do no come into contact with one another.

By the above-mentioned structure of the fourth preferred embodiment of the invention, a magnetically repulsive force F2 (F6) is produced between the first the second magnetic elements 61 and 62; and a magnetically repulsive force F1 (F5) is produced between the third and fourth magnetic elements 63 and 64 at the same time. Therefore, the magnetically repulsive force F2 (F6) that pushes the rotation shaft 42 towards the base 2 and the force F1 (F5) that pushes the rotation shaft 42 out of the base 2 cooperatively provide an axial positioning effect to the rotation shaft 42.

Figure 7:
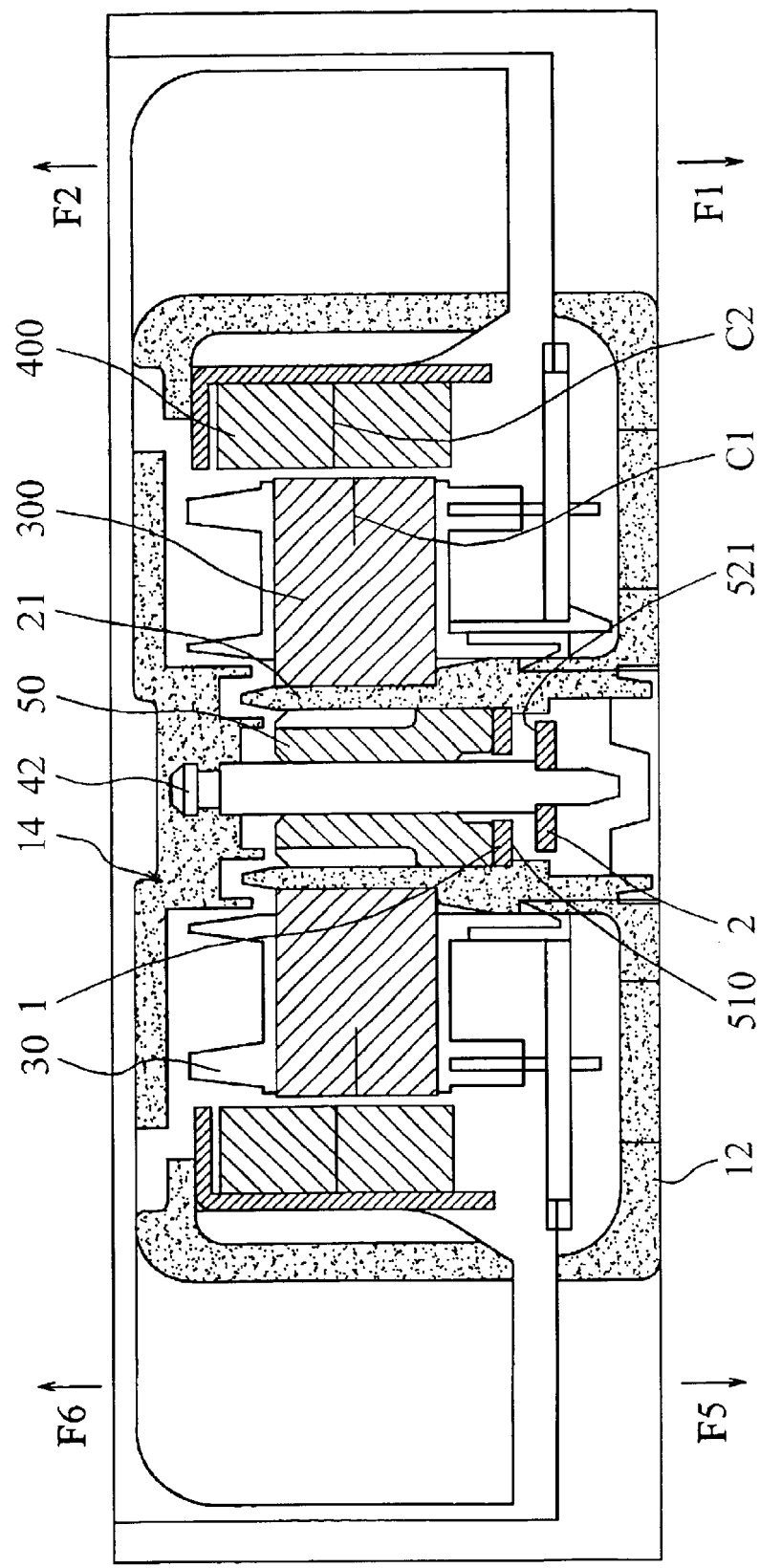
FIG. 7 is a sectional view of the motor having a magnetic bearing in accordance with a fifth embodiment of the invention.

Referring to the fifth preferred embodiment of the invention shown in FIG. 7, the fan motor in the embodiment includes a base 12, a stator 30, a rotor 14, a bearing 50 and a magnetic unit.

The magnetic unit is composed of a first magnetic element 1 and a second magnetic element 2. The first and second magnetic elements 1 and 2 are of the same pole and repulsive to each other. The second magnetic element 2 is ring-shaped with its center hole telescopically fitted near the lower end of the rotation shaft 42. The first magnetic element 1 is secured to the lower end of the rotation shaft 42 and is located above the second magnetic element 2, and it has a center hole with a diameter larger than that of the rotation shaft 42, to an extent that when the rotation shaft 42 passes through the first magnetic element 1, both of them do not come into contact with each other.

A magnetic centerline C1 of a magnetic body 300 of the stator 30 and a magnetic centerline C2 of a magnetic body 400 of the rotor 14 are not on the same level surface. Mutual deviation magnetism is utilized to provide axial magnetism, coupled with the magnetic unit, to achieve magnetic equilibrium.

Figure 8:
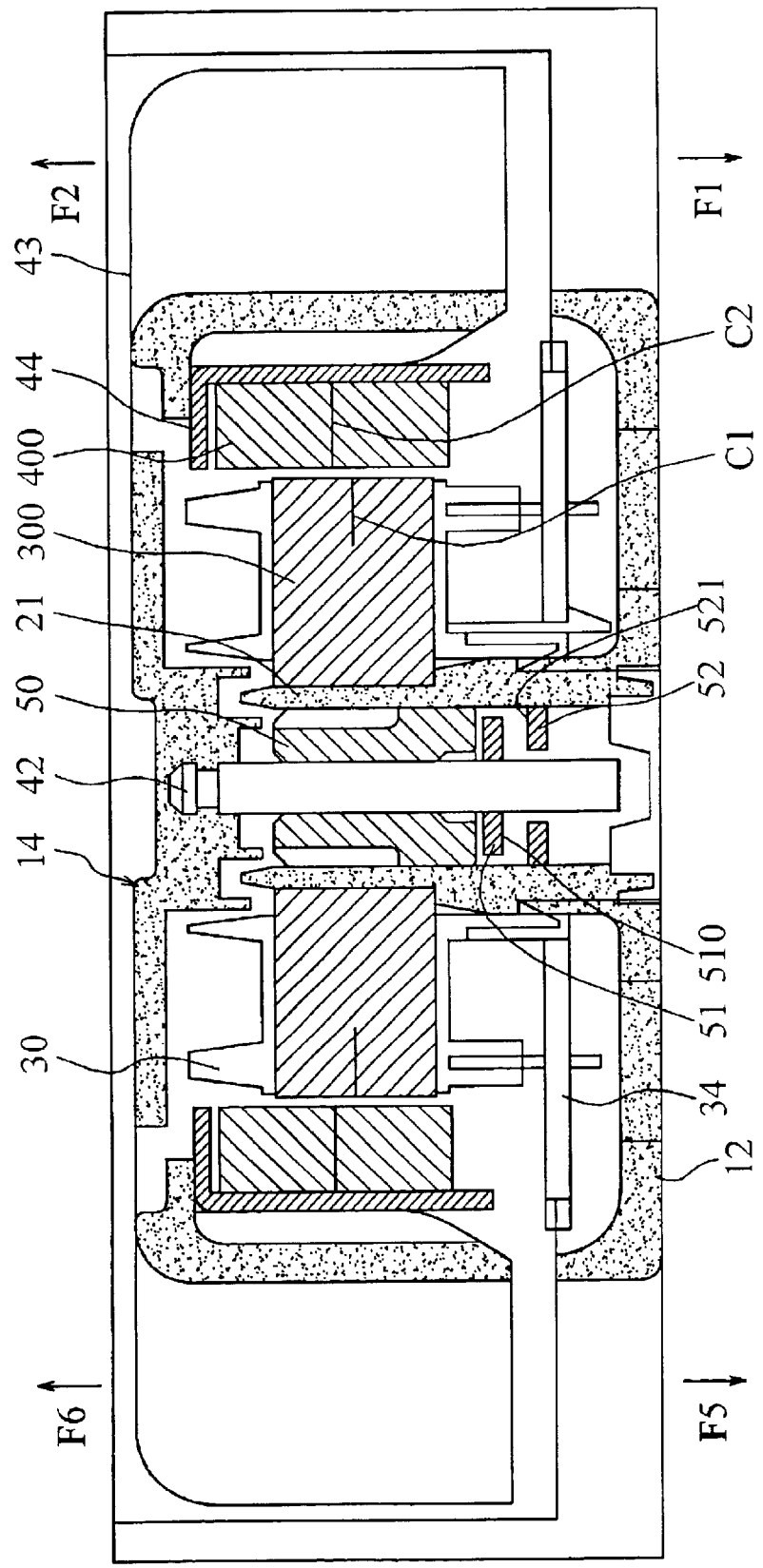
FIG. 8 is a sectional view of the motor having a magnetic bearing in accordance with a sixth embodiment of the invention.

Referring to FIG. 8 in accordance with the sixth preferred embodiment of the invention, the fan motor structure of the embodiment includes a base 12, a stator 30, a rotor 14, a bearing 50 and a magnetic unit.

The magnetic unit is composed of a first magnetic element 1 and a second magnetic element 2. The first and second magnetic elements 1 and 2 are of the same pole and repulsive to each other. The first magnetic element 1 is ring-shaped with its center hole telescopically fitted to the rotation shaft 42. The second magnetic element 2 is secured to the bearing seat 21 and is located below the first magnetic element 51 and it has a center hole with a diameter larger than that of the rotation shaft 42, to an extent that when the rotation shaft 42 passes through the second magnetic element 52, both of them do not come into contact with each other. As shown in FIGS. 3–8, the bearing 50 is a self-lubricating bearing.

The magnetic centerlines C1 and C2 of the magnetic body 300 of the stator 30 and the magnetic body 400 of the rotor 14, respectively, are not on the same level surface. The mutual deviation magnetism is utilized to provide axial magnetism, coupled with the magnetic unit, to achieve magnetic equilibrium.

The repulsive magnetic forces of the magnetic units in the first to sixth preferred embodiments may also be replaced by attractive magnetic forces of opposite poles for magnetism so as to obtain the axial positioning.

Conclusive from the above structures, the advantages of the invention are summarized as the following:

1. Magnetism is utilized to achieve axial positioning, and therefore there are no contact and friction during rotation.

2. External magnetic forces may be applied to compensate the insufficiency of magnetic bias between the rotor 14 and the stator 30, in a way that the rotor 14 and the stator 30 are unaffected by external forces and able to maintain a stationary equilibrium so as to achieve the purpose of gaining an excellent stability during rotation.

While the present invention has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A motor having a magnetic bearing comprising:
   a base provided with a bearing seat;
   a stator fixed onto the base,
   a rotor equipped with a rotation shaft and rotating relatively to the stator by magnetic forces generated from excitation;
   a self-lubricating bearing fastened to the bearing seat of the base for accommodating and supporting the rotation shaft of the rotor to limit the rotation shaft along the axial direction;
   an upper magnetic unit composed of a first and a second magnetic elements, wherein the first magnetic element is located above the second magnetic element to generate a magnetic force therebetween to prevent the contact with each other; and
   a lower magnetic unit composed of a third and a fourth magnetic elements, wherein the third magnetic element is located above the fourth magnetic element to generate a magnetic force therebetween to prevent the contact with each other.

2. The motor having a magnetic bearing as described in claim 1, wherein the fourth magnetic element is ring-shaped with its center hole telescopically fitted near a lower end of the rotation shaft; the third magnetic element is secured to a lower end of the bearing, and the diameter of the center hole of the third magnetic element is larger than that off the rotation shaft such that when the rotation shaft passes through the third magnetic element, the third and fourth magnetic elements do not come into contact with each other.

3. The motor having a magnetic bearing as described in claim 1, wherein the third magnetic elements is ring-shaped with its center hole telescopically fitted to the rotation shaft; the fourth magnetic element is secured onto the bearing seat, and the diameter of its center hole is larger than that of the rotation shaft such that when the rotation shaft passes through the third magnetic element, both of them do not come into contact with each other.

4. The motor having a magnetic bearing as described in claim 1, wherein the first and second magnetic elements are of the same pole and repulsive to each other, and the third and fourth magnetic elements are also of the same pole and repulsive to each other.

5. The motor having a magnetic bearing as described in claim 1, wherein the first and second magnetic elements are of opposite poles and attractive towards each other, and the third and fourth magnetic elements are also opposite poles and attractive towards each other.

6. A motor having a magnetic bearing comprising:
   a base provided with a bearing seat;
   a stator fixed to the base,
   a rotor equipped with a rotation shaft and rotates relatively to the stator by magnetic forces generated from excitation;
   a self-lubricating bearing fastened to the bearing seat of the base for accommodating and supporting the rotation shaft of the rotor to limit the rotation shaft along the axial direction;
   a magnetic unit composed of a first and a second magnetic elements, wherein the second magnetic element is located below the first magnetic element to provide an axial magnetic force and compensate the magnetic bias formed between the stator and the rotor, thus obtaining constant magnetic equilibrium.

7. The motor having a magnetic bearing as described in claim 6, wherein the first magnetic element is fixed to the bearing seat and the second magnetic element is ring-shaped with its center hole telescopically fitted to the rotation shaft.

8. The motor having a magnetic bearing as described in claim 6, wherein the first magnetic element is ring-shaped with its center hole telescopically fitted to the rotation shaft; and the second magnetic element is anchored to the bearing seat, and the diameter of its center hole is larger than that of the rotation shaft such that when the rotation shaft passes through the center hole of the second magnetic element, both of them do not come into contact with each other.

9. The motor having a magnetic bearing as described in claim 6, wherein the first and second magnetic elements are of the same pole and repulsive to each other.

10. The motor having a magnetic bearing as described in claim 6, wherein the first and second magnetic elements are of opposite poles and attractive towards each other.

11. The fan assembly having a magnetic bearing as described in claim 1, wherein the rotor includes the plurality of fan blades and is limited to a balanced position in accordance with magnetic forces from the magnetic units and wind force generated by the fan blades during rotation.

12. The fan assembly having a magnetic bearing as described in claim 6, wherein the rotor includes the plurality of fan blades and is limited to a balanced position in accordance with magnetically repulsive forces from the magnetic unit and wind force generated by the fan blades during rotation.

13. The motor having a magnetic bearing as described in claim 6, wherein the magnetic unit further comprises a third magnetic element located below the second magnetic element; whereby the second magnetic element is restrained between the first and third magnetic elements, therefore limiting a shift range of the rotation shaft.

14. A fan assembly having a magnetic bearing comprising:
   a base providing with a bearing seat;
   a stator fixed to the base;
   a rotor equipped with a rotation shaft and rotating relative to the stator by magnetic forces generated from excitation;
   a set of fan blades attached to the rotor;
   a bearing fastened to the bearing seat of the base for accommodating and supporting the rotation shaft of the rotor to limit the rotation shaft along the axial direction;
   a magnetic unit composed of first and second magnetic elements, wherein the second magnetic element is located below the first magnetic element to provide an axial magnetic force and compensate the magnetic bias formed between the stator and the rotor so as to limit the rotor to a balanced position in accordance with magnetic forces from the magnetic unit and wind force generated by the fan blades during rotation.

15. The fan assembly having a magnetic bearing as described in claim 14, wherein the first magnetic element is fixed to the bearing seat and the second magnetic element is ring-shaped with its center hole telescopically fitted to the rotation shaft.

16. The fan assembly having a magnetic bearing as described in claim 14, wherein the first magnetic element is ring-shaped with its center hole telescopically fitted to the rotation shaft; and the second magnetic element is anchored to the bearing seat, and the diameter of its center hole is larger than that of the rotation shaft such that when the rotation shaft passes through the center hole of the second magnetic element, the rotating shaft and the second magnetic element do not contact.

17. The fan assembly having a magnetic bearing as described in claim 14, wherein the first and second magnetic elements are of the same pole and are repulsive to each other.

18. The fan assembly having a magnetic bearing as described in claim 14, wherein the first and second magnetic elements are of opposite poles and are attractive towards each other.

19. The fan assembly having a magnetic bearing as described in claim 14, wherein the magnetic unit further comprises a third magnetic element located below the second magnetic element; whereby the second magnetic element is restrained between the first and third magnetic element, therefore limiting a shift range of the rotation shaft.

* * * * *